Feb. 13, 1968  W. R. KING  3,368,404
APPARATUS FOR FINDING AND MONITORING A LIQUID LEVEL
Filed May 23, 1966

INVENTOR.
WILLIAM R. KING
BY
*Fishburn and Gold*
ATTORNEYS

United States Patent Office 3,368,404
Patented Feb. 13, 1968

3,368,404
APPARATUS FOR FINDING AND MONITORING
A LIQUID LEVEL
William R. King, Liberal, Kans., assignor to Panhandle
Eastern Pipe Line Company, Kansas City, Mo., a corporation of Delaware
Filed May 23, 1966, Ser. No. 551,972
10 Claims. (Cl. 73—304)

This invention relates to liquid level sensing equipment and more particularly, to a new and improved apparatus for the finding and monitoring of a liquid level in a container such as a well bore.

In the field of natural gas production, it is necessary to maintain an accurate record of the water level within a particular well bore. As producing wells, storage wells and the like are quite numerous, it is particularly desirable to provide a dependable water level monitoring system at a relatively low cost of manufacture and installation and requiring a minimum of maintenance.

It is, therefore, the principal objects of this invention to provide a new and improved apparatus for finding and monitoring the liquid level with a container such as a well bore; to provide such an apparatus employing a liquid within said conducting liquid medium to find the liquid level and automatically monitor said liquid level as the level rises or lowers within said container; to provide such an apparatus utilizing relatively low voltages to enable the employment of said apparatus in hazardous areas where volatile components may accumulate; to provide such an apparatus which may be simply and inexpensively manufactured and installed, may be maintained at a minimum of time and expense and which operates at a high degree of accuracy and dependability.

This invention contemplates an apparatus for finding and monitoring the location of a liquid level which includes a sensing means including first, second and third electrodes, said electrodes being disposed at spaced elevations with the said electrodes being in an inactive position relative to said liquid with the first electrode being elevated above said liquid level, said second electrode being at said level in contacting relation to said liquid and said third electrode being submerged in said liquid. This invention further contemplates circuitry operatively connected to said spaced electrodes including means for providing a current flow at a low voltage through said liquid between said electrodes when the liquid is so disposed relative to said electrodes and means responsive to said current flow to raise or lower said sensing means to maintain the electrodes of said sensing means in the aforementioned relation to the liquid surface level. The invention further contemplates the employment of an indicating means operatively connected to said means for raising and lowering said sensing means for indicating and recording the amount of movement of said sensing means to maintain an accurate record of the liquid level within a container such as a well bore.

Other objects and advantages of this invention will become apparent from the following description taken in connection with the accompanying drawings wherein are set forth by way of illustration and example certain embodiments of this invention.

Figure 1:
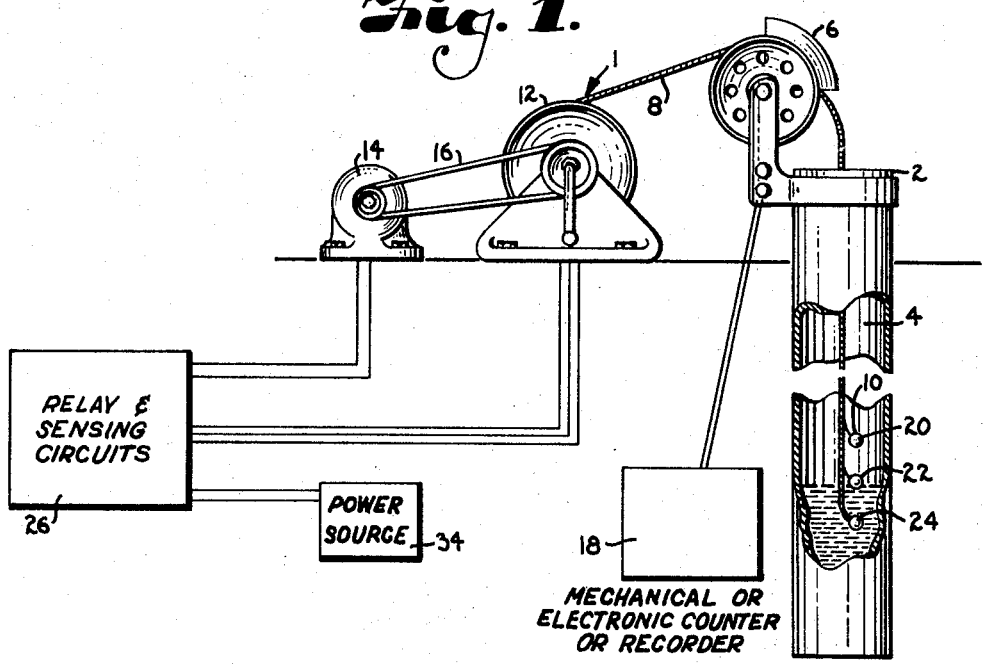
FIG. 1 is a diagrammatic view of an apparatus for finding and monitoring a liquid surface level embodying the features of this invention and illustrated in relation to a well bore.

Referring to the drawings in more detail:

The reference numeral 1 indictaes an apparatus for finding and monitoring the location of a liquid surface level or an interface between an electrical conducting medium and a non-conducting medium within a container, said container being illustrated herein as a well casing 2 defining a well bore 4. The well casing 2 is illustrated as having a measuring pulley assembly 6 suitably mounted thereto for receiving a cable 8 which, in the illustrated embodiment, is employed to support a liquid level sensing means 10. The cable 8 is operatively mounted to a reeling means 12 which is driven by a reversible motor 14 through a belt drive 16. The reeling means 12 is operable to take up or let out cable 8 to respectively raise or lower the sensing means 10 within the well bore 4 in response to fluctuation in the liquid level within the well bore 4. The measuring pulley assembly 6 is operatively connected in a conventional manner to a means for indicating the amount of displacement of said sensing means 10 within the well bore 4 by the operation of the reeling mechanism 12, said indicating means being illustrated herein as a mechanical or electronic counter or recorder mechanism 18 responsive to the measuring pulley assembly 6 to indicate the liquid surface level or interface within the well bore 4 and, if desired, to record the fluctuation of said level throughout desired time intervals. The invention has been defined in relation to a liquid level where air is the non-conducting medium; however, the apparatus 1 may also be utilized to locate and monitor a liquid interface between a conducting and non-conducting liquid such as water and oil.

The sensing means 10 is comprised of a plurality of sensing probes or electrodes at spaced elevations and operatively suspended from the cable 8 and adapted for movement vertically of the well bore 4 in response to conducting conditions within the circuitry connected to said electrodes. The sensing means 10, illustrated herein in a normal or inactive position, includes a first or upper electrode 20 disposed in overlying spaced relation to the liquid level, a second or middle electrode 22 at said level in contacting relation to said liquid and a third or lower electrode 24 submerged in said liquid. The electrodes 20, 22 and 24 are each operatively connected to relay and sensing circuits 26 for selective activation of the reversible motor 14 to drive the reel mechanism 12 in a predetermined direction for raising and lowering the cable 8 and sensing means 10 within the well bore 4. When the sensing means 10 is disposed in its normal or inactive position, the middle and lower electrodes 22 and 24 are each in contacting relation to the liquid and employ the liquid as a conducting medium for the flow of current between electrodes 22 and 24. The interruption of this current flow by the lowering of the liquid level out of contacting relation with the middle electrode 22 effects an electrical condition within the relay and sensing circuits 26 effecting the desired driving direction of the reel 12 by motor 14 to move the sensing means 10 to its normal or inactive position wherein the middle electrode is again in electrical contact with the liquid. When the liquid level within the well bore 4 rises into contacting relation with the upper electrode 20, a current flow is induced through the liquid betwen electrodes 20 and 22, thereby changing the electrical condition within the relay and sensing circuits 26 and effecting the desired operation of the reeling mechanism 12.

The upper electrode 20 and the middle electrode 22 are operatively connected by means of a first or cable raising circuit means 30, said circuit means 30 being in a normally non-conducting condition, but so arranged as to effect a current flow when the liquid level within the well bore 4 rises to a position in contacting relation with the upper electrode 20 to effect the activation of a relay means 33 to supply power from a power source 34 to the armature 36 of the motor 14 in a predetermined direction to drive motor 14 in such a direction as to elevate the sensing means 10 within the well bore 4 to its normal or inactive position. The raising of the sensing means 10 elevates electrode 20 above the liquid thereby breaking the current flow and ceasing the cable reeling action elevating sensing means 10.

The first circuit means 30 utilizes a PNP junction transistor 38, hereinafter referred to as transistor 38, to control the energization of the relay operating coil 32 of the relay means 39.

The electrode 20 is coupled with the collector 40 of the transistor 38 by conductive means 42 with the electrode 22 being operatively coupled to the base 44 of the transistor 38 by conductive means 46. The emitter 48 of transistor 38 is operatively coupled to the collector 40 of transistor 38 by conductive means 50 through the battery 51 and the relay operating coil 32, whereby activation of the transistor 38 will effect a current flow from the battery 51 to the relay operating coil 32 for energization thereof.

The emitter 48 of the transistor 38 is operatively connected to the base 44 of transistor 38 by a conductive means 54, said conductive means 54 being operatively connected to the base 44 through the conductive means 46 and to the emitter 48 through conductive means 50, said conductive means 54 being connected to conductive means 50 between the battery 51 and the relay operating coil 32. The emitter 48 is coupled to the base 44 of transistor 38 through a variable resistor 56 and a resistor 58 in the conductive means 54 for bias control. The variable resistor 56 is utilized within the first circuit means 30 to provide adjustments in the circuit resistance necessitated by varying conditions at the various wells where such an apparatus 1 may be utilized. This adjustment is necessary as resistivity of the liquid or water in well bore 4 varies widely among various wells depending upon the nature of the formation in which the well has been drilled. Secondly, the water level among various wells may vary considerably thereby necessitating greater length in the conductive means 42 and 46 requiring an adjustment in the circuit resistance to maintain the desired circuit balance.

A relay switch 60, operatively associated with the relay operating coil 32 for operation by the latter, includes a pole piece 62 normally in engagement with a stationary contact 64 and adapted to be shifted into engagement with another stationary contact 66 whenever the operating coil 32 is energized. The normally open contact 66 is coupled by conductive means 68 to the positive side of the battery 34 to effect upon the closing of switch 60 a current flow to the armature 36 of motor 14 to drive motor 14 in a predetermined direction to elevate the sensing means 10. The stationary contact 64 is operatively coupled by a conductive means 70 to the negative side of battery 34 to complete the circuit through armature 36 when the pole piece 62 is in a closed position and the second circuit means 31 is energized to drive motor 14 in a direction opposite that of the driving direction activated by the first circuit means 30.

Considering the operation of the circuitry of the first circuit means 30, assume initially that the liquid level in the well bore 4 is not in contacting relation with the upper electrode 20. In this condition, there is no conduction through the conductive means 42 and 46 to the electrodes 20 and 22 and the transistor 38 is in a cut-off or non-conductive condition as the reverse bias between the collector and the base is sufficiently balanced the proper selection of values for the battery 51, resistors 56 and 58 and transistors 38. In the illustrated embodiment, when the transistor 38 is in a non-conductive condition, the collector 40 has a negative potential relative to the base 44 and the base 44 has a negative potential relative to the emitter 48.

Figure 2:
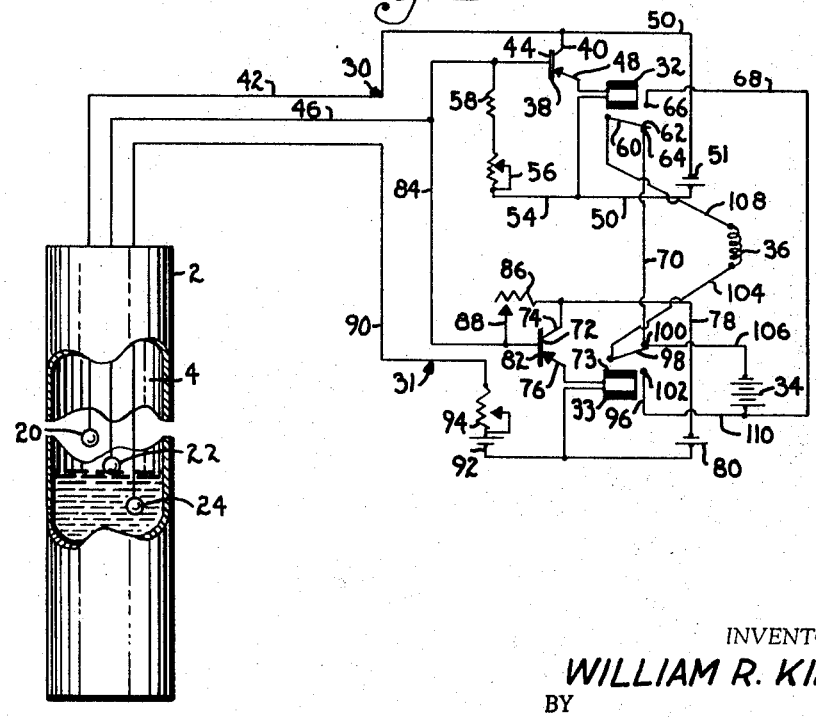
FIG. 2 is a schematic diagram of the circuitry of the apparatus for finding and monitoring a liquid surface level as illustrated in FIG. 1.

Next, assume that the water level within the well bore 4 rises to contacting relation with the first or upper electrode 20, thereby completing the circuit between the conductive means 42 and 46. The completion of this circuit effectively equalizes the bias between the collector 40 and the base 44 of transistor 38, thereby increasing the bias between the base 44 and the emitter element 48. The increase in the forward bias of the base 44 and emitter 48 effects an increase in the emitter and collector currents, thereby providing the desired current amplification for activation of the relay operating coil 32, causing the pole piece 60 to swing into contacting relation with the stationary contact 66 thereby completing the circuit through conductive means 68 to the positive side of the battery 34, the negative side of the battery 34 being operatively connected through circuitry related to the relay means 33 associated with the second circuit means 31 which in its inactive position, as illustrated in FIG. 2, provides a conductive means to the motor armature 36.

Once the upper electrode 20 is elevated above the liquid surface level or is out of contacting relation with the liquid, the current flow ceases between electrodes 20 and 22 causing the transistor bias between the base 44 and collector 40 to return transistor 38 to its normal or non-conducting condition, thereby stopping the current amplification to the relay operating coil 32 opening switch 60. By the proper selection of transistor 38, a sufficient time delay may be effected in the first circuit means 30 from the point of circuit break between electrodes 20 and 22 and the cessation of power to the relay operating coil 32 thereby allowing sufficient time for the reeling mechanism to elevate the sensing means 10 to its normal position with electrode 22 at the liquid surface level. It should also be noted that the action of the first circuit means 30 could elevate the second electrode 22 out of contact with the liquid whereupon the second circuit means 31 would be activated to lower the second electrode 22 to the point of contact with the liquid, thereby completing the circuit in the second circuit means 31 and stopping the reeling action with the electrode 22 at the liquid level.

By the utilization of an amplifying transistor circuit to activate the relay means 33, the signal circuit through the electrodes of the sensing means 10 may be operated at a relatively low potential eliminating the danger of arcing between the electrodes or the electrodes and the well casing 2.

The second circuit means 31 is operatively connected to the middle or second electrodes 22 and the lower or third electrode 24 and is responsive to a current break effected by the lowering of the water level within the well bore 4 out of contacting relation with the middle electrode 22 to operate the relay means 33 to actuate the reversible motor 14 in a predetermined direction to lower the sensing means 10 within the well bore 4.

The second circuit means 31, as illustrated, utilizes a PNP junction transistor 72, hereinafter referred to as transistor 72, to control the energization of the relay operating coil 73 of relay means 33 for selective activation of the reversible motor 14.

The collector element 74 of the transistor 72 is coupled with the emitter element 76 of transistor 72 by a conductive means 78 through a power source illustrated as a battery 80 and the relay operating coil 73. The middle electrode 22 and the well bore 4 is coupled to the base 82 of the transistor 72 by a conductive means 84 which is common throughout a portion of its length in the illustrated embodiment with the conductive means 46 of the first circuit means 30. The collector element 74 is operatively coupled through a variable resistor 86 to the base 82 by a conductive means 88 operatively connected to the conductive means 84 between the base element 82 and the middle electrode 22. The variable resistor 86 is employed to adjust or balance the bias condition of the transistor 72 to such a point where transistor 72 will not conduct until contact is broken between the electrodes 22 and 24 or current flow ceases therebetween.

The emitter element 76 of transistor 72 is operatively coupled with the base element 82 by a conductive means 90 through a power source, illustrated as a battery 92, through a variable resistor 94 and the electrodes 24 and 22. The variable resistor 94 is employed in the same manner discussed in relation to the variable resistor 56 of the first circuit means 30 to compensate for variations in the length of the conductive means 84 and 90 and variations in the resistivity of the liquid in the well bore 4, such that the second circuit means may be maintained in the desired balanced relation.

A relay switch 96, operatively associated with the relay coil 73 for operation by the latter, includes a pole piece 98 normally in engagement with a stationary contact 100 and adapted to be shifted into engagement with another stationary contact 102 whenever the coil 73 is energized. The pole piece 98 is operatively coupled to the motor armature 36 by a conductive means 104 with the stationary contact 100 being operatively coupled to the negative side of the battery 34 by a conductive means 106, thereby providing a circuit from the negative side of the battery 34 through conductive means 106 and 104 to the armature 36 of the motor 14 when the pole piece 94 is in its normal or inactive position. It should be noted that the pole piece 98 will be in a normal or inactive position whenever the first circuit means 30 is activated to effect a circuit completion through the battery 34 and the motor armature 36. The pole piece 62 of relay switch 60 being similarly disposed in an inactive position adjacent the stationary contact 64 is operatively connected by conductive means 70 to the negative side of the battery 34, said pole piece 62 being operatively connected by means of a conductive means 108 to the armature 36 to provide a circuit leg from the negative side of the battery 34 to the armature 36 when the relay means 33 of the second circuit means 31 is energized to swing the pole piece 98 into contacting relation with the stationary contact 102, thereby connecting the positive side of the battery 34 to the armature 36. Stationary contact 102 is operatively connected to the positive side of the battery 34 by the conductive means 110 to, upon activation of the operating coil 73, swing the pole piece 98 into contact with the stationary contact 102 to drive the motor 14 in a predetermined direction to lower the sensing means 10 of well bore 4.

In considering the operation of the second circuit means 31, assume initially that the liquid level within the well bore 4 is in contacting relation with the middle or second electrode 22 thereby providing a conducting condition between the conductive means 84 and 90 through the liquid medium within the well bore 4. In this condition, the batteries 80 and 92 and the resistors 94 and 86 have been properly selected to provide the proper bias conditions on the transistor 72 such that the transistor 72 is in a non-conducting condition with the collector element 74 having a negative potential relative to the base 82 and emitter 76, and the base being properly balanced by means of the variable resistor 86 and having a sufficient intermediate potential of the collector and emitter elements to maintain the transistor 72 in a non-conductive state.

Next, consider the situation where the liquid level within the well bore 4 has lowered out of contacting relation with the middle electrode 22, thereby breaking the current flow through the liquid medium and altering the circuit balance in the second circuit means 31 to such an extent that the transistor 72 effects a sufficient current flow to energize the relay operating coil 73. Again, it should be noted that the control signal through the electrodes 22 and 24 or the potential created at the electrodes 22 and 24 can be maintained sufficiently low to prevent the possibility of arcing between the electrodes 22 and 24 or the electrodes and the casing 2 of well bore 4 to prevent the possibility of explosion in areas of gas accumulation.

The breaking of the circuit between the conducting means 84 and 90 increases the forward bias of the base and emitter, thereby increasing the emitter and collector currents effecting the desired amplification to actuate the operating coil 73.

The actuation of the operating coil 33 causes the pole piece 98 to swing into contacting relation with the stationary contact 102 thereby completing the circuit through conducting means 110, pole piece 98 and conducting means 102 from the positive side of the battery 34 to the armature 36 of the reversible motor 14, driving said motor 14 in a predetermined direction to lower the sensing means 10 in the well bore 4. The proper selection of the transistor 72 will effect the desired time delay between the circuit completion between electrodes 22 and 24 and the cessation of current amplification through transistor 72 to cause the proper positioning of the sensing means 10 relative to the liquid surface level.

In general operation, the reeling means 12 and the reversible motor 14 will be operatively mounted at the well head with the cable 8 passing through a measuring pulley 6 and having the sensing means 10 operatively suspended therefrom and extending freely down into the well casing 2. The cable 8 is then lowered within the well casing 2 with the counter or recorder operatively connected to the measuring pulley assembly 6 indicating and/or recording the amount of cable passing through the assembly 6 such that the vertical distance of the water level beneath the well head may be accurately ascertained.

As the sensing means 10 is lowered with the well bore, the lower or third electrode will first come into contact with the liquid in well bore 4 and then the second or middle electrode 22 will engage the liquid effecting a current flow in the manner previously discussed through the second circuit means 31 to thereby de-energize the relay operating coil 73 causing the switch 96 to open, thereby stopping the current flow from the battery 34 to the armature 36 of the motor 14. It should be noted that when the cable 8 and the sensing means 10 are at the surface or ground level, the electrodes 22 and 24 have no conducting medium interposed therebetween such that the conducting means 84 and 90 are in a non-conducting condition placing the transistor 72 of the second circuit means 31 in a conducting condition energizing the relay coil 73 and closing the relay switch 96 completing the circuit from the positive side of the battery 34 to the armature 36, thereby effecting the lowering of the sensing means 10 within the well bore 4.

With the middle or second electrode 22 in connecting relation with the liquid in the well bore 4, placing the sensing means 10 in its normal or inactive position, the sensing means 10 will continuously and automatically follow or monitor the surface level of the liquid within the well bore 4 by effecting the raising and lowering of the cable 8 through energization of the respective relay operating coils 32 and 73 of the relay means 32 through the circuit means 30 and 31 respectively in the manner previously discussed herein. The mechanical or electronic counter or recorder, being operatively connected in a conventional manner to the measuring pulley assembly 6, maintains an accurate and current indication of the existing water level within the well bore 4 and may, in the case of the recorder, maintain an accurate record of the fluctuations of said water level.

It is to be understood that while I have illustrated and described one form of my invention, it is not to be limited to the specific form or arrangement of parts herein described and shown except insofar as such limitations are included in the claims.

What I claim and desire to secure by Letters Patent is:
1. An apparatus for monitoring the location of a liquid level comprising:
(a) sensing means including first, second and third electrodes disposed at spaced elevations, said electrodes being in an inactive position relative to said liquid level with said first electrode being elevated above said liquid level, said second electrode being in contacting relation to said liquid and the third electrode being submerged in said liquid, (b) a first circuit means operatively connected to said first and second electrodes whereby current flow is induced between said first and second electrodes when the liquid level rises to contacting relation with said first electrode, (c) a second circuit means operatively connected to said second and third electrodes whereby current flows between said second and third electrode through said liquid, (d) means operatively connected to said sensing means and responsive to current flow in said first circuit means to raise said sensing means to said inactive position and responsive to a break in current flow in said second circuit means to lower said sensing means to said inactive position.

2. An apparatus for monitoring the location of a liquid level as recited in claim 1 wherein said apparatus includes indicating means operatively connected to said means for raising and lowering said sensing means for indicating the movement of said sensing means.

3. An apparatus as recited in claim 2 wherein said first and second circuit means each includes a current amplifying means and a relay means, said amplifying means being responsive to an electrical change within the respective circuit means to effect a current flow to said relay means, said relay means being connected to said means for raising and lowering said sensing means and operable to selectively activate said means for raising and lowering said sensing means.

4. An apparatus as recited in claim 3 wherein the amplifying means of said first circuit means includes a transistor in a normally non-conducting state and responsive to a current flow through said liquid between said first and second electrodes to conduct current through said relay means to activate said relay means.

5. An apparatus as recited in claim 3 wherein the amplifying means of said second circuit means includes a transistor in a normally non-conducting condition, said transistor being operatively coupled to said second and third electrodes and said relay means and responsive to a break in current flow between said second and third electrodes to effect a current flow through said relay means to activate said relay means.

6. An apparatus as recited in claim 4 wherein the first electrode includes conductive means coupled to the collector element of said transistor and wherein said second electrode includes conductive means coupled to the base element of said transistor, said first circuit means including a power source, said power source and said relay means being operatively connected between the collector and emitter elements of said transistor wherein the flow of current between the first and second electrodes tends to to equalize the potential at the base and collector, thereby increasing the forward bias of the emitter element and increasing the collector emitter currents to actuate the relay means.

7. An apparatus as recited in claim 5 wherein said second circuit means includes a power source, said power source and said relay means being operatively connected on a circuit loop from the collector element to the emitter element of said transistor and wherein said second electrode includes conductive means operatively connected to the base element of said transistor, said third electrode includes conductive means operatively connected to said collector-emitter loop between said power source and said relay means, said second circuit means also including means for maintaining a predetermined bias on said transistor as current is flowing between said second and third electrodes to maintain said transistor in a non-conducting state whereby a break in current flow between said second and third electrodes reduces the potential at said base element, thereby increasing the bias from said base element to said emitter element thereby increasing the emitter and collector currents and actuating the relay means.

8. An apparatus as recited in claim 1 wherein said sensing means includes a cable freely suspendable in a well bore or the like, said cable having said first, second and third electrodes operatively connected thereto with said cable being operatively connected to said means for raising and lowering said sensing means to said inactive position.

9. An apparatus as recited in claim 8 wherein said means for raising and lowering said sensing means includes a reeling means and a reversible driving means, said reeling means being operatively connected to said cable and said reversible driving means being operatively connected to said reeling means for selective actuation of said reeling means to raise or lower said cable, said reversible driving means being operatively connected to said first and second circuit means and responsive thereto for selective actuation of said reeling means.

10. An apparatus as recited in claim 9 wherein said reversible driving means is comprised of a reversible motor having an armature and a power source and wherein said first and second circuit means each includes a relay means to selectively connect said armature to said power source with the relay means of said first circuit means operatively connecting one side of said armature to the positive side of said power source and the other side of said armature to the negative side of said power source for driving said motor in a predetermined direction for raising said sensing means and wherein said relay means of said second circuit means is operable to connect said second side of said armautre to the positive side of said power source and the first side of said armature to the negative side of said power source to drive said reeling means in the opposite direction to lower said sensing means, the relay means of said first circuit means being responsive for actuation of said motor to the flow of current between said fist and second electrodes, said relay means of said second circuit means being responsive to actuate said armature to said motor to break in current flow between said second and third electrode.

References Cited
UNITED STATES PATENTS

| | | | |
|---|---|---|---|
| 2,551,225 | 5/1951 | Spierer | 340—244 XR |
| 2,855,552 | 10/1958 | Tapp et al. | 73—304 XR |
| 3,062,994 | 11/1962 | Mesh | 73—304 XR |

LOUIS R. PRINCE, *Primary Examiner.*

DONALD O. WOODIEL, *Assistant Examiner.*